Figure 1:
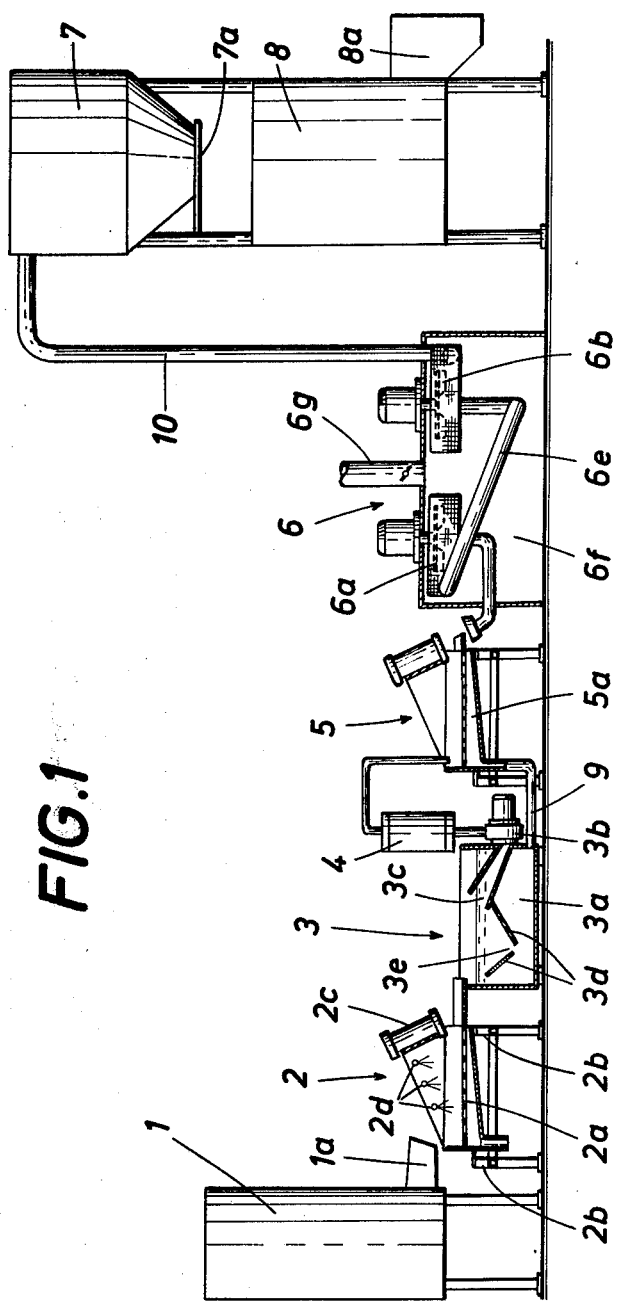

United States Patent [19]

Bacher

[11] 4,145,172

[45] Mar. 20, 1979

[54] PLANT FOR TRANSFORMING SYNTHETIC THERMOPLASTIC WASTE INTO AN AGGLOMERATE

[75] Inventor: Helmuth Bacher, Linz, Austria

[73] Assignee: Krauss-Maffei Austria Ges.m.b.H., Asten, Austria

[21] Appl. No.: 852,282

[22] Filed: Nov. 17, 1977

[30] Foreign Application Priority Data

Nov. 25, 1976 [AT] Austria .................... 8756/76

[51] Int. Cl.² ............................................. B29B 1/02
[52] U.S. Cl. ................................... 425/222; 425/317; 425/DIG. 201; 34/60
[58] Field of Search ................ 425/86, 222, 225, 317, 425/DIG. 206, DIG. 201; 264/117; 34/60; 210/296

[56] References Cited

U.S. PATENT DOCUMENTS

| | | | |
|---|---|---|---|
| 2,684,290 | 7/1954 | Alexander et al. | 425/222 X |
| 3,651,179 | 3/1972 | Shea et al. | 264/117 X |
| 3,981,659 | 9/1976 | Myers | 425/222 |
| 4,050,871 | 9/1977 | Kleeberg et al. | 425/DIG. 201 X |

*Primary Examiner*—Robert L. Spicer, Jr.
*Attorney, Agent, or Firm*—Kurt Kelman

[57] ABSTRACT

Washing and disintegrating means serve to wash and disintegrate the waste material and to continuously deliver the resulting washed and disintegrated material. A first conveyor serves to receive said washed and disintegrated material from said washing and disintegrating means and to remove water from said washing and disintegrating means and to remove water from said material. A dirt separator serves to receive said washed and disintegrated material from said first conveyor and to remove dirt from said washed and disintegrated material and to deliver the resulting cleaned material. A second conveyor serves to receive said cleaned material from said dirt separator and to remove water from said cleaned material. A water collector serves to receive water removed by said second conveyor. A return conduit serves to deliver water from said water collector to said dirt separator. Continuously operable drying means serve to receive said cleaned material from said second conveyor and to dry said cleaned material and to continuously deliver the resulting dried material. A buffer serves to receive said dried material from said drying means and to intermittently deliver said dried material. Intermittently operable agglomerating means serve to receive said intermittently delivered dried material from said buffer and to transform said dried material into an agglomerate.

8 Claims, 3 Drawing Figures

PLANT FOR TRANSFORMING SYNTHETIC THERMOPLASTIC WASTE INTO AN AGGLOMERATE

This invention relates to a plant for transforming thin synthetic thermoplastic waste, particularly in the form of sheeting, into an agglomerate, comprising washing and disintegrating means, drying means, and agglomerating means.

In a known plant (German Pat. Specification No. 2,005,360) the washing and disintegrating means comprise a container which serves to receive the material to be processed and is provided with rotating and stationary knives and with a fresh water feed conduit opening into the upper portion of the container. A sieve opening for the outflow of soiled water is provided in the bottom portion of the container. Material in process is discharged through a separate opening, which can be closed by means of a hinged door. When the disintegrating and washing process has been completed, the disintegrated plastics material waste, which is still wet, is fed through the discharge opening to a centrifuge, which serves as drying means. The material which is discharged from the centrifuge is finally completely dried and is compacted and agglomerated in the succeeding agglomerating means and is then available as starting material for extrusion or injection moulding processes or for other purposes. In view of the mode of operation of the washing and disintegrating means and of the agglomerating means, the operation of the plant is intermittent so that the control involves high labour costs and difficulties are involved in an automatic control which may be desired.

The plastics material waste to be processed is often mixed with earth, small stones (e.g., in the case of fertilizer bags), metal parts or other foreign matter. It has been found that only part of these impurities leave the container of the washing and disintegrating means through the sieve opening and another part of the foreign matter moves through the entire plant and is incorporated into the agglomerates during the agglomerating step. It will be understood that in the processing of the resulting agglomerates by extrusion or injection moulding, such incorporated impurities will give rise to an increased wear of the apparatus, a reduced safety of operation and a reduced quality of the resulting products.

It is an object of the invention to eliminate these disadvantages and to provide a plant which is of the kind described first hereinbefore and in which all impurities are reliably removed before the agglomerating means and a continuous operation is enabled.

This object is accomplished according to the invention in that the washing and disintegrating means continuously deliver the material in process, the drying means also operate continuously, a dirt separator is arranged between said washing and disintegrating means and said drying means and is connected to each of these means by a water-removing conveyor, said dirt separator consists preferably of a liquid-containing vessel and a suction pump which succeeds said vessel and has a funnel-shaped suction inlet disposed on the surface level of liquid in said vessel and is provided with a discharge conduit leading to the succeeding conveyor, which is provided with a water collector, which is connected by a return conduit to the lower portion of the liquid-containing vessel, and the agglomerating means are preceded by a buffer for receiving and for intermittently feeding material in process to the agglomerating means.

The plastics material waste is continuously fed to the washing and disintegrating means and is disintegrated by the knives thereof. Dirt is removed from the waste by the washing water at the same time. When the chips of sheeting have been reduced to a certain size, they can leave the washing and disintegrating means together with the effluent water and are fed by the conveyor to the dirt separator, in which impurities can settle to the bottom of the liquid-containing vessel as the chopped material is sucked toward the suction inlet of the pump. As a result of the operation of the pump and the return flow of water, a flow is maintained in the vessel and ensures the movement of the chips into the suction inlet of the pump. Additional dirt particles are removed from the plastics material in the pump and are removed together with the water on the second conveyor so that the plastics material chips are effectively separated from all impurities and a continuous operation results as material in process is continuously discharged from the washing and disintegrating means and is fed to the drying means, which also operate continuously and are succeeded by a buffer, which matches the continuous feeding of the plant to the intermittent operation of the agglomerating means so that an automatic operation can be effected with a relatively simple control.

Guide walls are preferably provided in the liquid-containing vessel in the region between the suction inlet of the suction pump and the region in which material in process is received by the vessel and said guide walls direct the liquid to flow from the receiving region of the vessel to the suction inlet and leave free an opening in which dirt particles can settle. As a result, a shortcircuit flow path between the return conduit and the suction inlet of the pump is avoided and the dirt particles have time to settle to the bottom during the transfer of the plastics material chips.

When the material to be processed is highly soiled, the suction pump may be directly succeeded by a gravity separator consisting of at least one hydrocyclone.

In a particularly suitable arrangement, the conveyors consist of perforated vibratory troughs and at least one shower head for water is disposed over the vibratory trough which directly succeeds the washing and comminuting means so that the soiled water from the washing and disintegrating apparatus is removed and part of the impurities are washed off. Alternatively, the conveyors may consist of perforated conveyor belts. In that case too, shower heads over the first conveyor will be desirable.

It will also be desirable to provide drying means which consist of at least one radial blower, which has preferably a vertical axis of rotation and comprises a volute housing having a perforated shell through which the droplets of water can escape which have been thrown off by centrifugal force. Such blower is desirable because it serves also as a conveyor so that no difficulties and no additional structural expenditure are involved in the transfer of the material in process into the buffer. If the drying effect of one such blower is not sufficient, two or more radial blowers can readily be connected in series in such a manner that the outlet opening of the volute housing of one blower is connected to the axial inlet opening of the succeeding blower.

Within the scope of the invention, the volute housing or housings may be surrounded by a dryer housing, which has at least one air outlet opening, which is provided with a throttle valve. The drying and transfer effect may be optimized in that the air which leaves the dryer housing is throttled to a higher or lower degree.

Figure 2:
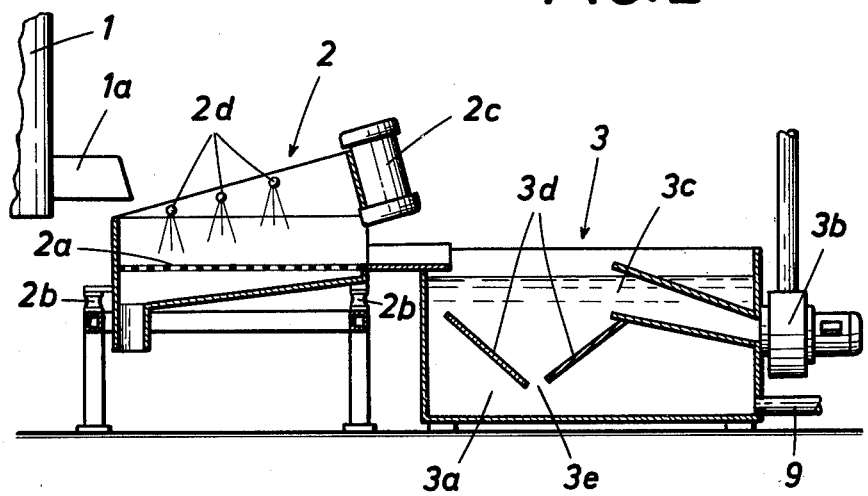
Figure 3:
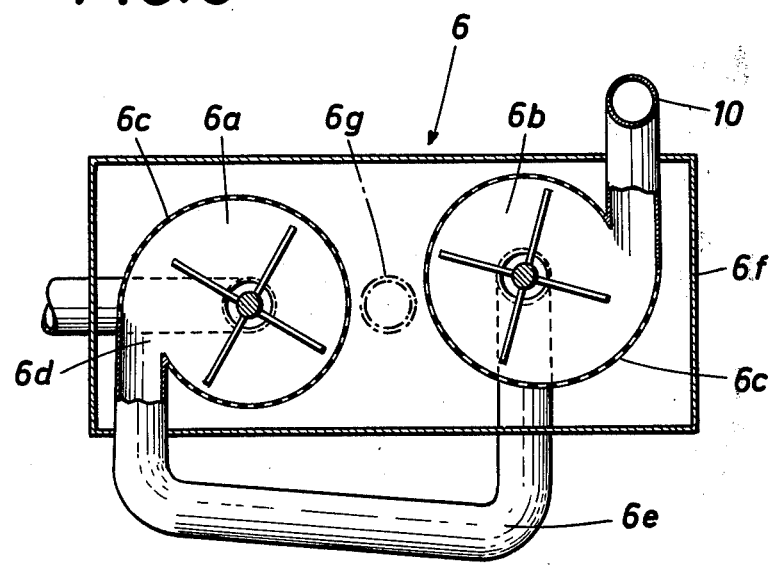

The invention is illustrated by way of example on the accompanying drawings, in which FIG. 1 is a diagrammatic view showing the entire plant, FIG. 2 is an enlarged diagrammatic vertical sectional view showing the dirt separator and the preceding vibratory trough, and FIG. 3 is an enlarged diagrammatic horizontal sectional view showing the drying means.

A washing and disintegrating unit 1 is continuously applied with material to be processed and is provided in the usual manner with a water inlet and rotating knives, which cooperate with stationary knives. Material in process which has been disintegrated to a certain size leaves the unit 1 together with soiled water through a discharge pipe 1a, which is provided with a sieve. The material in process is received by a conveyor, which is generally designated 2 and on which water is removed and which delivers the material in process to a dirt separator 3, from which the material in process is pumped to a gravity separator consisting of at least one hydrocyclone 4, which delivers the material in process to a second conveyor 5. The latter is succeeded by a drying apparatus 6, which consists of two radial blowers, which have vertical axes of rotation and deliver the material in process to a buffer vessel 7, which is provided at its bottom with a hinged door 7a, through which material in process can be intermittently charged into a conventional agglomerator 8, which consists of a vessel providee with rotating knives and a suitable product outlet 8a.

It is apparent from FIG. 2 that the conveyor 2 consists of a vibratory trough 2a, which is mounted on rubber members 2b and is vibratable by means of a suitable unbalanced rotary motor 2c. Shower heads 2d for cleaning the material in process are disposed above the vibratory trough 2a. The vibratory trough 2a discharges into the dirt separator 3, which consists of a liquid-containing vessel 3a and a suction pump 3b, which has a funnel-shaped suction inlet 3c disposed on the surface level of the liquid. Guide walls 3d are disposed in the region between the suction inlet 3c of the suction pump 3b and the region in which material in process is received from the vibratory trough 2a. These guide walls 3d leave free an opening 3e through which the dirt particles can settle. Just as the conveyor 2, the conveyor 5 consists of a vibratory trough, except for the difference that the water collector 5a of the conveyor 5 is connected by a return conduit 9 to the lower portion of the liquid-containing vessel 3a.

As is apparent from FIG. 3, the dryer 6 consists of two radial blowers 6a, 6b, which have vertical axes of rotation and comprise a volute housing having a perforated shell 6c. The material in process is axially sucked into the first blower 6a from the conveyor or vibratory trough 5 and leaves the housing through an opening 6d and is transferred through a transfer conduit 6e to and axially enters the second blower 6b, which delivers the material in process through a rising conduit 10 to the buffer vessel 7. Water which has been thrown off can escape through the perforations of the volute housing shell 6c.

What is claimed is:

1. A plant for transforming synthetic thermoplastic waste into an agglomerate, comprising washing and disintegrating means for washing and disintegrating said waste and for continuously delivering the resulting washed and disintegrated material, a first conveyor for receiving said washed and disintegrated material from said washing and disintegrating means and for removing water from said material, a dirt separator for receiving said washed and disintegrated material from said first conveyor and for removing dirt from said washed and disintegrated material and for delivering the resulting cleaned material, a second conveyor for receiving said cleaned material from said dirt separator and for removing water from said cleaned material, a water collector for receiving water removed by said second conveyor, a return conduit for delivering water from said water collector to said dirt separator, continuously operable drying means for receiving said cleaned material from said second conveyor and for drying said cleaned material and for continuously delivering the resulting dried material, a buffer for receiving said dried material from said drying means and for intermittently delivering said dried material, and intermittently operable agglomerating means for receiving said intermittently delivered dried material from said buffer and for transforming said dried material into an agglomerate.

2. A plant as set forth in claim 1, in which said dirt separator comprises a vessel and a suction pump which succeeds said vessel and has a funnel-shaped suction inlet, said vessel being adapted to be filled with liquid above the level of said funnel, a discharge conduit for delivering said cleaned material to said second conveyor is connected to said suction pump, and said return conduit opens in the lower portion of said vessel.

3. A plant as set forth in claim 2, in which said first conveyor is adapted to deliver said washed and disintegrated material to said vessel in a first region thereof, which is spaced from said suction funnel, and guide walls are disposed in a region between said first region and said funnel-shaped suction inlet and adapted to direct said liquid in said vessel to flow from said first region to said suction inlet, and leave free between them an opening in which dirt particles can settle.

4. A plant as set forth in claim 2, in which a gravity separator consisting of a hydrocyclone is connected between said suction pump and said discharge conduit.

5. A plant as set forth in claim 1, in which each of said conveyors consists of a vibratable perforated trough, and water-spraying means are disposed over said perforated trough which constitutes said first conveyor.

6. A plant as set forth in claim 1, in which said drying means comprise at least one radial blower having a volute housing which has a perforated shell.

7. A plant as set forth in claim 6, in which said radial blower has a vertical axis of rotation.

8. A plant as set forth in claim 6, in which said drying means comprise a dryer housing which surrounds said at least one radial blower and has at least one air outlet opening, which is provided with throttling means.

* * * * *